United States Patent [19]
Ohta et al.

[11] Patent Number: 4,982,710
[45] Date of Patent: Jan. 8, 1991

[54] ELECTRONIC THROTTLE VALVE OPENING CONTROL METHOD AND SYSTEM THEREFOR

[75] Inventors: Kenji Ohta, Katsuta; Shigeru Horikoshi, Mito; Hayato Sugawara, Katsuta, all of Japan

[73] Assignees: Hitachi, Ltd., Tokyo; Hitachi Automotive Engineering Co., Ibaraki, both of Japan

[21] Appl. No.: 430,015

[22] Filed: Nov. 1, 1989

[30] Foreign Application Priority Data
Nov. 7, 1988 [JP] Japan .................. 63-279341

[51] Int. Cl.$^5$ .................................................. F02D 7/00
[52] U.S. Cl. .................................................. 123/399
[58] Field of Search ............ 123/399, 396, 336, 337, 123/361, 400, 403, 198 D

[56] References Cited
U.S. PATENT DOCUMENTS

| | | | |
|---|---|---|---|
| 4,819,597 | 4/1989 | Gale et al. | 123/399 |
| 4,862,854 | 9/1989 | Oda et al. | 123/399 |
| 4,892,071 | 1/1980 | Asayama | 123/399 |
| 4,899,709 | 2/1990 | Aufmkolk | 123/399 |
| 4,909,213 | 3/1990 | Mezger et al. | 123/399 |

*Primary Examiner*—Raymond A. Nelli
*Attorney, Agent, or Firm*—Antonelli, Terry, Stout & Kraus

[57] ABSTRACT

An electronic throttle valve opening control system provides an actuating D.C. motor for opening or closing the throttle valve and a control circuit for controlling the D.C. motor current in response to the difference between the detected real throttle valve opening and a target value of the throttle valve opening. In addition to the above difference signal, the D.C. motor is controlled by a first correction quantity signal in accordance with variation of the detected throttle valve opening and a second correction quantity signal in accordance with the friction force existing in a valve opening control mechanism.

8 Claims, 7 Drawing Sheets

ELECTRONIC THROTTLE VALVE OPENING CONTROL METHOD AND SYSTEM THEREFOR

FIELD OF THE INVENTION

The present invention relates to an electronic throttle valve opening control method and system for an internal combustion engine suitable for adjusting throttle valve opening in response to an accelerator pedal position using a D.C. motor.

BACKGROUND OF THE INVENTION

In accordance with the improvement in the performance and the increase in the power of an automobile in recent years, there has been noted the application of the so-called "traction control system (TCS)", in which a predetermined actuator, such as an electric motor, is used for opening or closing a throttle valve, so that the opening degree of the throttle valve may be controlled by first introducing the opening degree of an accelerator pedal as data into a control unit, such as a microcomputer, to subject it to a predetermined arithmetic operation to calculate a desired opening degree of the throttle valve and then by feeding the calculated opening degree of the throttle valve to the actuator.

This system requires an actuator for controlling the opening degree of the throttle valve, as described hereinbefore. The actuator of this kind known per se is exemplified by using a D.C. motor, as disclosed in Japanese laying-Open Patent Publication No. Sho 61-93251.

The actuator using the D.C. motor is considered advantageous from the point of view of response, cost and size so that it has a tendency to be widely adopted.

The above prior art, however, has taken no consideration into the influences of the operation condition changes at the driven mechanism, such as the throttle valve of the actuator, thus raising a problem in the high precision of the throttle opening control.

SUMMARY OF THE INVENTION

An object of the invention is to provide an electronic throttle valve opening control method and system with high responsiveness.

Another object of the present invention is to provide an electronic throttle valve opening control method and system for controlling accurately the valve opening without influences of operation condition changes and aged deterioration.

Another object of the present invention is to provide an electronic throttle valve opening degree control system which is enabled to have a sufficiently high precision in the valve opening degree by eliminating the influence from friction existing at the driven portion of the actuator.

The above objects can be achieved by learning the variation which influences the operation characteristic of the D.C. actuating motor and by changing the control variables in response thereto. In short, when the throttle valve is in a stable stop condition, such as a full open condition or a full close condition, the system detects the spring constant and undertakes a learning process.

In addition to the spring constant as a cause of operation characteristic fluctuation, there is a frictional force fluctuation of a throttle bearing portion and a motor bearing portion. As the frictional force variation acts on the control system so as to change the observed spring force value, it is possible to compensate accurately various kinds of variations with high accuracy by learning control of the observed spring constant, which includes the influence of the friction and the inertia.

According to a feature of the present invention, the control loop system is constructed by using both a control variable proportional to the difference between a target value and an actual value of the opening degree, i.e., a proportional term (P-controlled component) and a control variable corresponding to the differentiated value of the opening degree, i.e., a differential term (D-controlled component). These components would be insufficient for the desired precision if friction is present in the object to be controlled.

Hence, the drop in the control precision can be suppressed by adding a control correction quantity considering the frictional force so that a control result of high precision can be easily achieved.

DESCRIPTION OF THE PREFERRED EMBODIMENT

Figure 1:
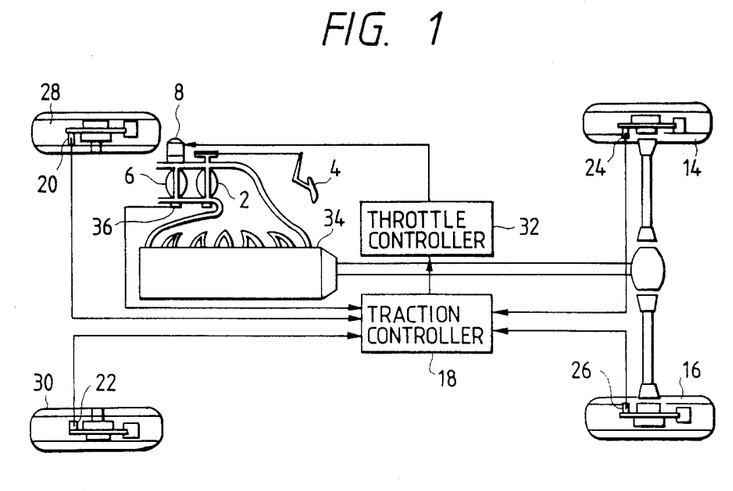
FIG. 1 is a schematic illustration explaining a driving system according to the present invention.
Figure 2:
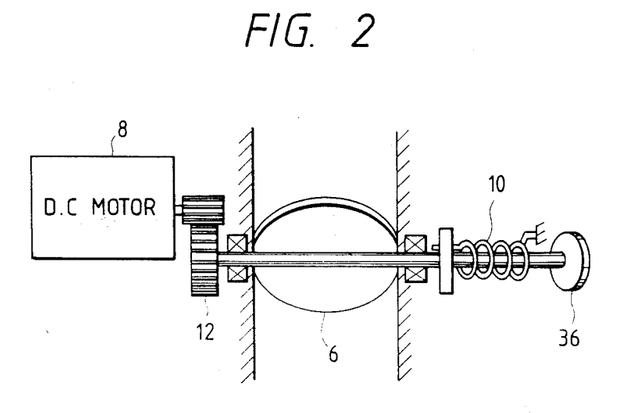
FIG. 2 is a detail view of the throttle valve shown in FIG. 1.

A system for controlling the opening of a throttle valve according to the present invention will be described in detail in the following Embodiment with reference to the accompanying drawings. FIG. 1 is an explanatory view showing a traction control system for an automobile to which one embodiment of the present invention is applied. The traction control system shown in FIG. 1 is of the so-called "tandem type", in which the throttle valves are dual. The system is equipped with a first throttle valve 2 to be operated directly by an accelerator pedal 4, and a second throttle valve 6 to be opened or closed by a D.C. motor 8 acting as a throttle actuator so that the traction control is accomplished by controlling the opening of the second throttle valve 6. As shown in FIG. 2, the second throttle valve 6 provides return spring 10 biasing it to a fully open position for fail-safe operation, so that it may be automatically returned to its fully open position if the current supply to the D.C. motor 8 is interrupted. The D.C. motor 8 is coupled to the second throttle valve 6 through a gear 12 for opening and closing the valve 6 against the spring 10. An automobile of high performance driven by a high-power engine will produce slip due to excessive torque at the driving wheels 14 and 16, as has been described hereinbefore, if the accelerator pedal 4 is improperly operated.

Thus, the traction controller 18 receives a signal from the individual wheel speed sensors 20, 22, 24 and 26 to detect the occurrence of slip in terms of the difference between the speeds of the driving wheels 14 and 16 and driven wheels 28 and 30 and feeds a command to a throttle controller 32 to control the D.C. motor 8 and accordingly the degree of opening of the second throttle valve 6 thereby to adjust the output of engine 34 so that the slip may be suppressed within a predetermined range.

The opening valve of the second throttle valve 6 at this time is detected by a throttle sensor 36 and is fed to the traction controller 18, thus constituting a feedback control system.

Figure 3:
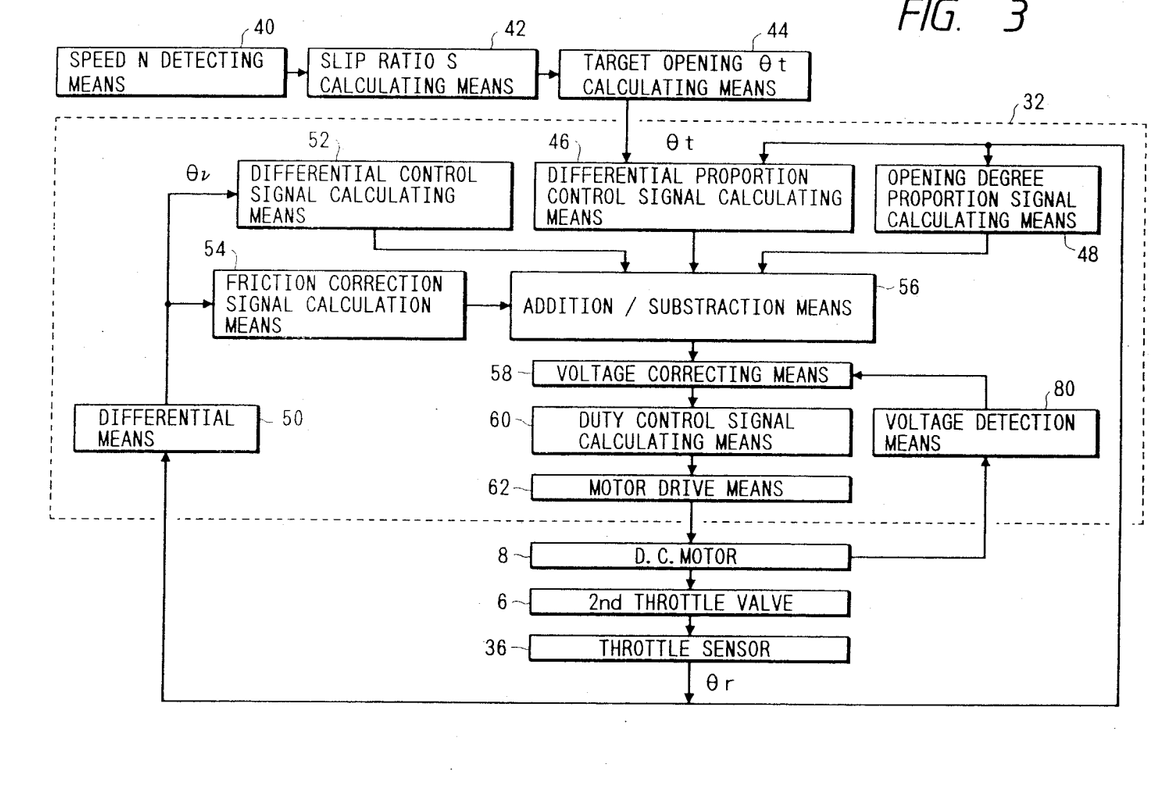
FIG. 3 is a block diagram showing an embodiment of the throttle controller according to the present invention.

The present invention will be described with reference to FIG. 3 showing one embodiment of the throttle controller 32. The detected signals of the wheel speed sensor 20, 22, 24 and 26 are fed to speed detecting means 40 and further to slip ratio calculating means 42 to calculate a slip ratio S indicating the degree of slip.

As has been described hereinbefore, the opening degree of the second throttle valve 6 is so controlled that the slip ratio S may be confined within a predetermined range. It is target opening calculating means 44 which operates to calculate the opening degree at this time, i.e., a target opening degree $\theta t$.

The target opening degree $\theta t$ thus calculated is inputted to the throttle controller 32, which in turn is connected to receive the actual opening degree $\theta r$ of the second throttle valve 6 from the throttle sensor 36.

The target opening degree $\theta t$ and the actual opening degree $\theta r$ are inputted to differential proportion control signal calculating means 46 to calculate a control signal proportional to the difference in those signals, i.e., a differential proportion control signal.

Moreover, the actual opening degree $\theta r$ from the throttle sensor 36 is inputted to opening degree proportion signal calculating means 48 to generate an opening degree proportion signal.

The actual opening degree $\theta r$ from the throttle sensor 36 is also fed to differential means 50 to output an opening differentiated value $\theta v$ providing data indicating the moving speed of the second throttle valve 36. This opening differentiated value $\theta v$ is fed to differential control signal calculating means 52 and friction correction signal calculating means 54. A differential control signal corresponding to the opening differentiated value $\theta v$ is fed from the differential control signal calculating means 52, whereas the friction correction signal is outputted from the friction correction signal calculating means 54.

All the signals of these four lines are fed to addition/-subtraction means 56, which calculates the signals of three lines, i.e., the differential proportion control signal from the differential proportion control signal calculating means 46, the differential control signal from the differential control signal calculating means 52, and the opening degree control signal from the opening degree proportion signal calculating means 48, although the friction correction signal to be fed from the friction correction signal calculating means 54 will be described hereinafter.

The calculated result is corrected by voltage correcting means 58 and then inputted to duty control signal calculating means 60. The corrected signal is converted by the calculating means 60 into a duty signal for D.C. motor controls, which is fed to motor drive means 62 to drive the D.C. motor 8 thereby to open or close the second throttle valve 6.

Figure 4:
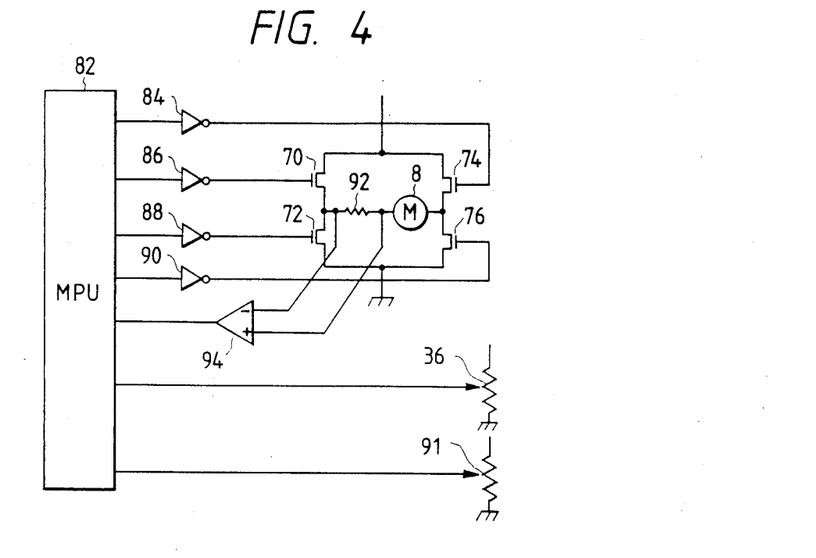
FIG. 4 is a circuit diagram showing an embodiment of the motor drive circuit.

FIG. 4 shows the detail of the motor drive means 62, which is constructed of the so-called "H-type transistor bridge circuit" composed of four FETs 70, 72, 74 and 76. By controlling the conductions of the FETs on diagonal lines, e.g., FETs 70 and 76, and FETs 72 and 74 in pairs, the D.C. motor 8 is rotated forward and backward. More specifically, the current control of the D.C. motor 8 is accomplished by controlling the conductions of the individual FETs with pulse signals and by changing the duty of the pulse signals.

If, at this time, the current of the D.C. motor 8 is controlled to a predetermined value, namely, if the aforementioned duty is set at a predetermined value, the value of the actual current flowing through the D.C. motor 8 will be changed with its terminal voltage.

Thus, the voltage is corrected by detecting the voltage of the D.C. motor 8 with voltage detection means 80 and by feeding this detected result to the abovementioned voltage correcting means 58.

A microcomputer 82 provides a ROM storing a program, a RAM and an A/D converter, and controls selectively four FETs 84, 86, 88 and 90 in response to the output signal of the throttle sensor 36 and an accelerator pedal position sensor 91 to adjust the D.C. motor current. The D.C. motor current is measured by detecting the voltage across a resistor 92. An amplifier 94 supplies the microcomputer 82 with the detected motor current signal for controlling continuously the amplitude of the D.C. motor current.

Figure 5:
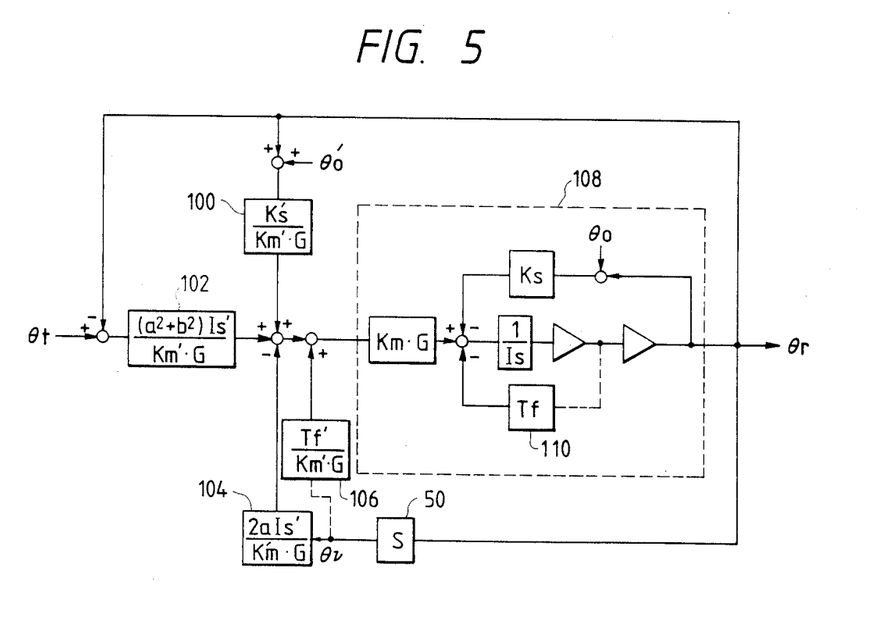
FIG. 5 is a control block diagram showing an embodiment of the throttle valve opening control system according to the present invention.

The aforementioned functions of the throttle controller 32 are shown in a control block form in FIG. 5.

In FIG. 5, a block 100 including the spring constant Ks' of a return spring 10 corresponds to the opening degree proportion signal calculating means 48; a block 102 including the inertia Is' of the whole second throttle valve actuating system composed of the D.C. motor 8 and the throttle valve 6 corresponds to the differential proportion control signal calculating means 46; a block 104 also including the inertia Is' and fed with the differentiated opening degree valve $\theta v$ corresponds to the differential control signal calculating means 52; and a block 106 corresponds to the friction correction signal calculating means 54. Incidentally, a block 108 represents the whole structure of a throttle valve actuating mechanism which is composed of the D.C. motor 8 and the throttle valve 6. A block 110 represents one which acts as a correcting term for a friction torque constant $T_f$.

Definitions of parameters are as follows.
Tm: D.C. motor torque
Tfm: function torque of the motor shaft
Im: inertia of the D.C. motor
$\theta m$: rotation angle of the D.C. motor
G: gear ratios of a reduction mechanism interposed between the D.C motor 8 and the throttle valve 6
Ig: inertia of the gear
$\theta r$: throttle valve opening position
$\theta_0$: setting position of the spring 10

Ks: spring constant
Tf: friction torque of throttle shaft
Tv: air resistance of the throttle valve
I: motor current
Km: torque constant indicating the output torque per unit current value of the D.C. motor 8
Ks: real spring constant
Is: real inertia
a,b: pole assignment dominating the response time from the instant when an opening command for the throttle valve 6 is issued to the instant when the throttle valve 6 reaches an opening degree corresponding to the opening command.

When the D.C. motor 8 is operated to open the fully closed throttle valve, the inertia Is is given by the following equation.

$$Is' = ImG^2 + Ig$$

$$\ddot{\theta}_r + \frac{Ks'}{Is'}\theta_r - \frac{G}{I}Km'I + \frac{1}{I}(T_f - T_v + T_{fm} \cdot G) \quad (1)$$

A state equation is given by $$\begin{bmatrix} \dot{X}_1 \\ \dot{X}_2 \end{bmatrix} = \begin{bmatrix} 0 & 1 \\ -\frac{Ks'}{Is'} & 0 \end{bmatrix} \begin{bmatrix} X_1 \\ X_2 \end{bmatrix} + \begin{bmatrix} 0 \\ 1 \end{bmatrix} \quad (2)$$

$$y = [1\ 0] \begin{bmatrix} X_1 \\ X_2 \end{bmatrix} \quad (3)$$

where
$X_1 = \theta r$
$X_2 = \dot{\theta} r$
$U = \theta t$
$y = X_1$
When state feedback $$F = \left(2a, a^2 + b^2 \frac{Ks'}{Is'}\right) \begin{bmatrix} X_1 \\ X_2 \end{bmatrix}$$

is applied to obtain an arbitrary responsiveness, the block diagram is changed into the diagram in FIG. 5.

Now assuming Ks=Ks', Is=Is', the detail explanation are continued.

If Km=Km', the total control system can be dealt with simplified state equations (4), (5).

$$\begin{bmatrix} \dot{X}_1 \\ \dot{X}_2 \end{bmatrix} = \begin{bmatrix} 0 & 1 \\ -a^2 - b^2 & -2a \end{bmatrix} \begin{bmatrix} X_1 \\ X_2 \end{bmatrix} + \begin{bmatrix} 0 \\ 1 \end{bmatrix} u \quad (4)$$

$$y = [1\ 0] \begin{bmatrix} X_1 \\ X_2 \end{bmatrix} \quad (5)$$

When parameters a and b are set, the responsiveness of the control system coincides with the following transfer function (6).

$$GS = \frac{a^2 + b^2}{S^2 + 2as + a^2 + b^2} \quad (6)$$

However, the current value supplied to the D.C. motor 8 has a limit and it is difficult to equate the responsiveness of the system with the above state equation or transfer function. A little difference between them has no influence on the stability of the total system.

Figure 6:
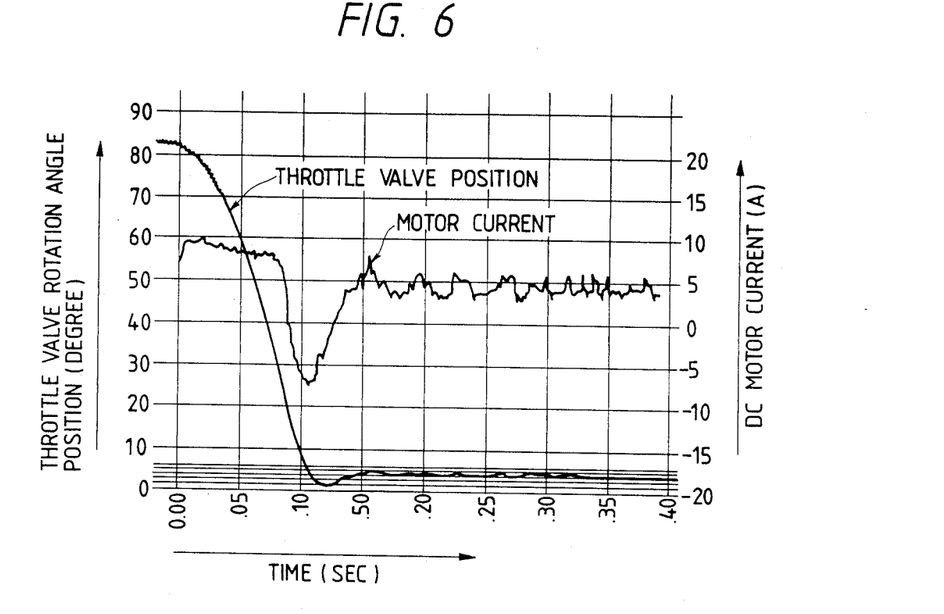
FIG. 6 is a graph showing the relationship between real rotation angle position of the throttle valve and the real D.C. motor current.

FIG. 6 is a graph showing the relationship between the real rotation angle position of the throttle value 6 and the real D.C. motor current value. Maximum D.C. motor current is limited so as not to allow flow of an over current through the D.C. motor the starting time point thereof. As the above limit is released after 0.08 second from the starting point, the responsiveness coincides with the above mentioned transfer function.

In the case where the above mentioned rotation position control by the D.C. motor is applied to the throttle valve position control, it is required to avoid overshooting in the throttle valve control. If the throttle valve strikes a stopper by overshooting, the strike causes a fault, noise and a short life of the system.

The embodiment of the present invention makes it possible to obtain a responsiveness free from overshooting by selecting properly the above parameters a and b.

Figure 7:
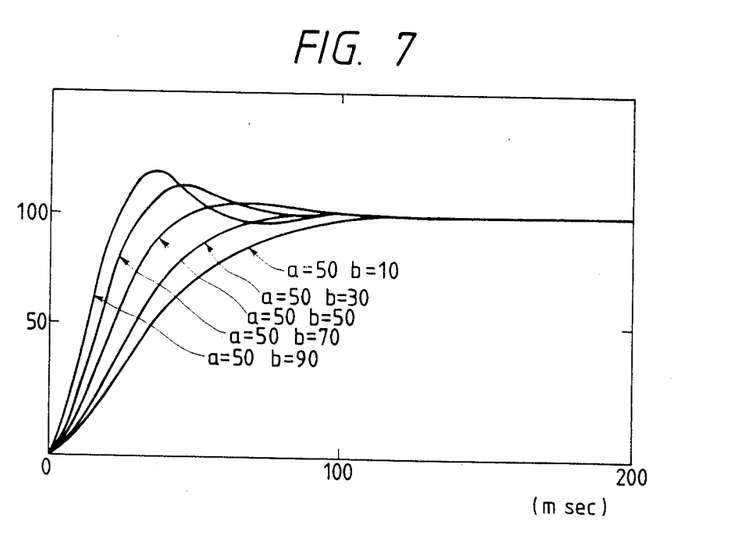
FIG. 7 is a graph showing response characteristic at varying parameter b.

FIG. 7 shows a response characteristic curve when the parameter b is maintained at a constant value and the parameter b is varied. Apparent from FIG. 7, a proper value b which minimizes the setting time exists and no overshooting occurs.

Figure 8:
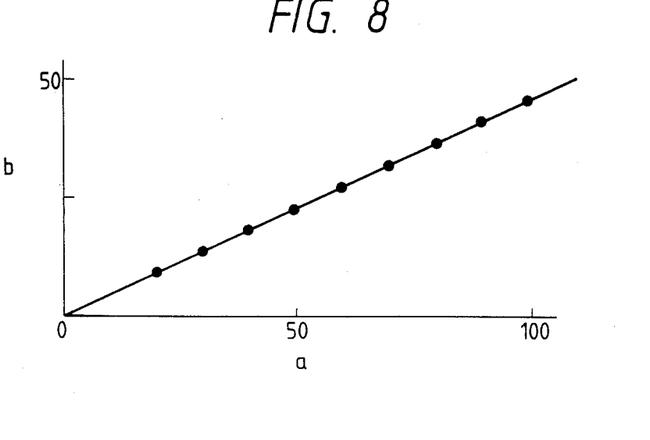
FIG. 8 is a graph showing the relationship between the parameter a and b.
Figure 9:
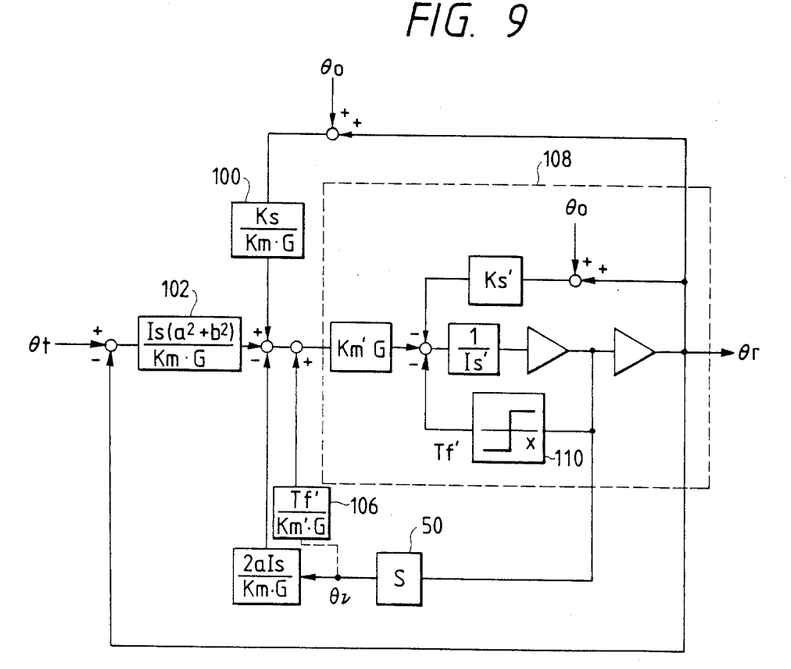
FIG. 9 is a control block diagram showing another embodiment of the throttle valve opening control system according to the present invention.

FIG. 8 shows an optimum value of parameter b for a parameter value a. This graph is convenient for determining the parameters a and b.

In the above explanation, the third term of the formula (1) is neglected, however, the friction torque, hysteresis of the spring and initial setting load of the spring are added.

In FIG. 5 friction torque and spring hysteresis are considered as $T_f$, or velocity function $\dot{\theta}$, and the initial setting position of the spring 10 as $\theta_0$..

The initial setting load of the spring Ks $x\theta_0$ is compensated by the equation $$\frac{Km}{Km'} Ks' \theta_0$$

in the control circuit.

The friction torque and hysteresis of the spring 10 is also compensated by the equation $$T_f = \frac{Km}{Km'} T_f.$$

As the initial setting position $\theta_0$ of the spring 10, and the friction torque and spring hysteresis $T_f$ vary considerably with product dispersion, environmental change, and age deterioration, it is impossible to determine unequivocally $\theta_0$, $T_f$ in the control circuit.

When the value $\theta_0'$ fails to compensate the $\theta_0$ and the control system is in a stable state (fully opened or fully closed position), the following equation is given.

$$Is'(a^2+b^2)(\theta t-\theta r)=Ks'(\theta_0'-\theta_0)$$

where Ks=Ks', Km=Km'.
The equation is changed as follows.

$$\theta_t - \theta_R = \frac{Ks'}{Is'(a^2 + b^2)} (\theta_0' - \theta_0)$$

$T_f$ is a function varying with the velocity $\dot{\theta}$.

At the beginning of the start of the throttle valve, friction load by $T_f - T_f'$ generates force against the movement of the throttle valve 6.

It is desirable to satisfy the equation $T_f - T_f' = 0$ for the throttle valve operation characteristic, however, reducing $T_f - T_f'$ to zero is quite difficult. If $T_f - T_f' < 0$, the control system becomes unstable. Accordingly, it is advisable to set $T_f - T_f' > 0$ to act the difference $T_f - T_f'$ as friction.

The positive value $T_f - T_f'$ makes a deviation $\theta t - \theta r$ given by $$\theta_t - \theta_r = \pm \left\{ \frac{1}{Is'(a^2 + b^2)} (Tf - Tf') \right\}$$

Figure 10:
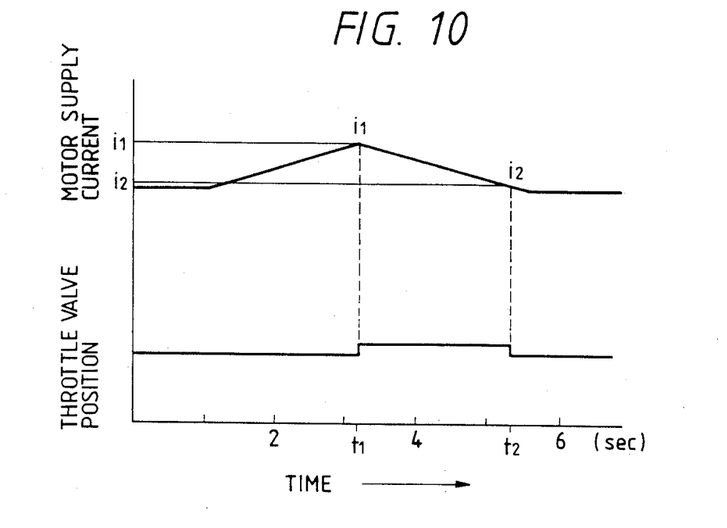
FIG. 10 is a graph showing variation of the throttle valve opening when the D.C. motor current is gradually decreased.

FIG. 10 shows the throttle valve movement when the D.C. motor current is gradually increased or decreased. Only the D.C. Motor current is varied in FIG. 10. When $i_1$ is a current value at the time point $t_1$, where the throttle valve begins to move in one direction, and $i_2$ is a current value at the time point $t_2$ where the throttle valve begins to move in the reverse direction, the following equations are given.

$$Kmi_1 = Ks\theta_0 + T_f$$

$$Kmi_2 = Ks\theta_0 - T_f$$

$$\theta_0 = \frac{Km}{Ks}(i_1 + i_2)$$

According to the above equation, if $$\theta_0 = \frac{Km}{Ks}(i_1 + i_2)$$

$\theta_0$ is estimated and compensated by $\theta_{0'}$.

Figure 11:
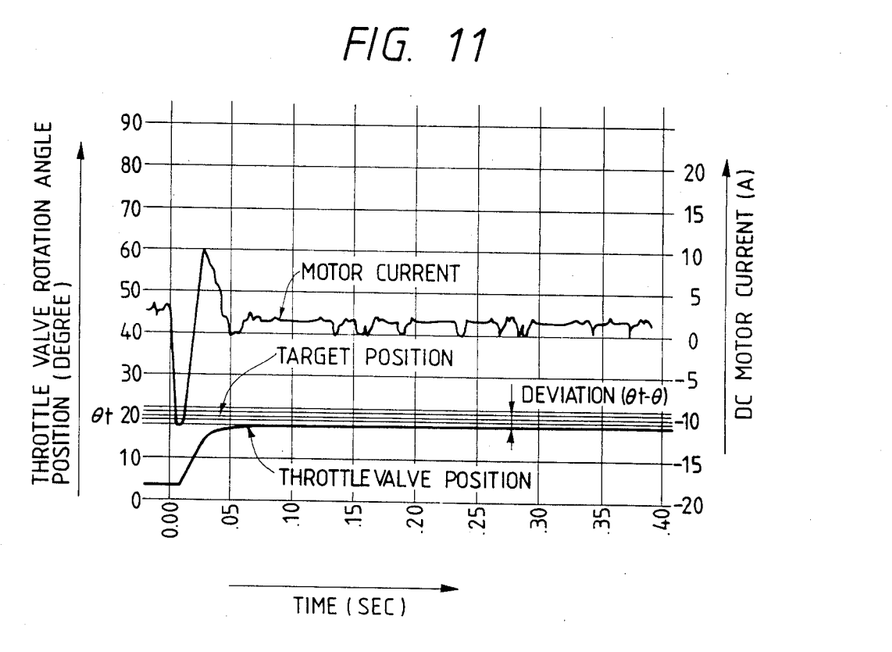
FIG. 11 is a graph showing the responsibility characteristic of the throttle valve position.

FIG. 11 shows an example of the response characteristic when $T_f - T_f' > \theta_0$ and the target position $\theta_t = 20°$.

Because of $T_f - T_f' > \theta_0$, the deviation $\theta_t - \theta_r$ which is not compensated remains.

If $T_f' - T_f = 0$, the deviation will be reduced to zero. As it is difficult to control $T_f - T_f' = 0$ in the practical system, the parameters a and b are changed to overshoot and the deviation $T_f - T_f'$ is compensated by its overshooting. As a result, the control system has an accurate and stable control characteristic as shown in FIG. 6.

Figure 12:
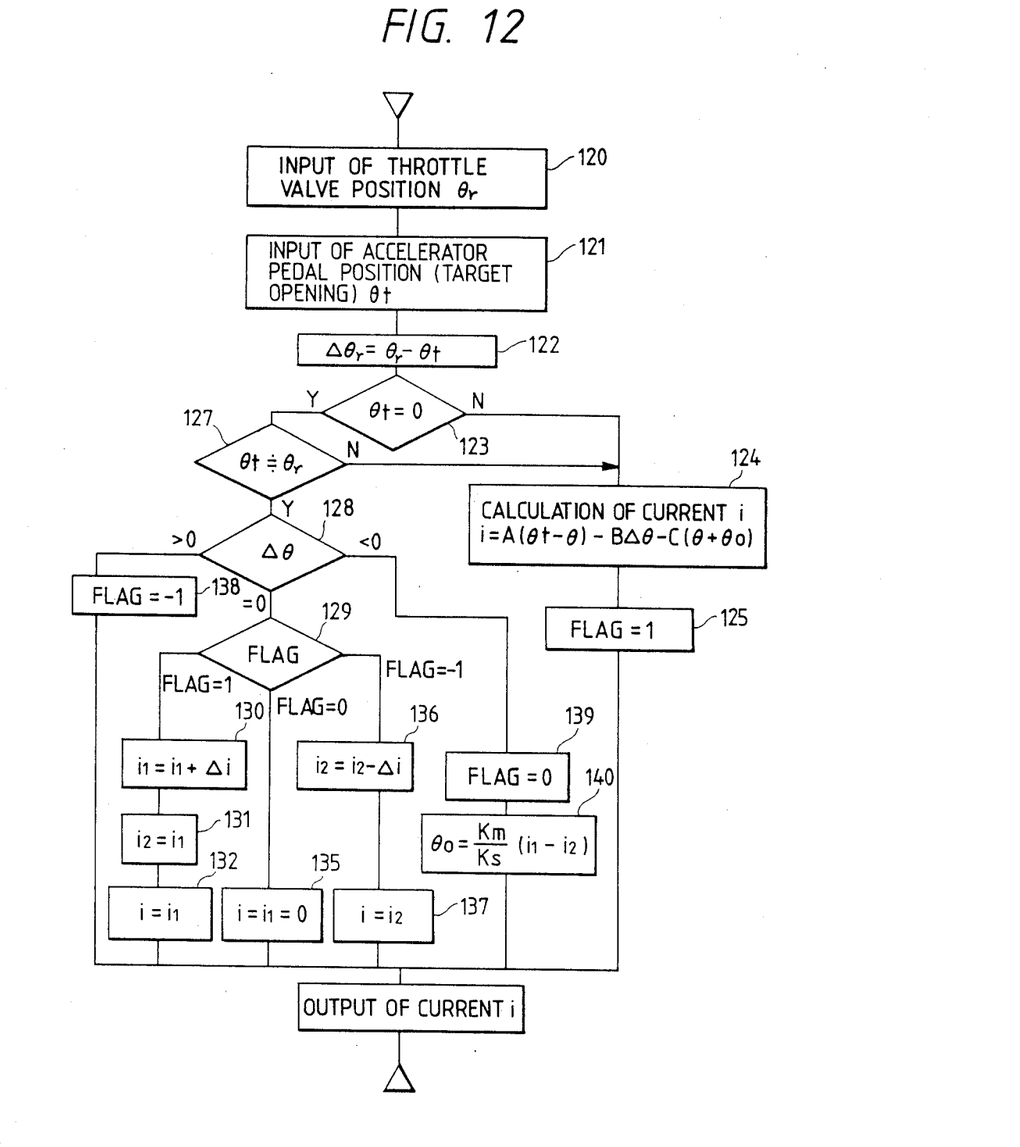
FIG. 12 is a flow chart of calculation program.

FIG. 12 is a flow chart of a calculation program provided in the micro-processor unit 82. The flow chart is started at every predetermined period of time by a time scheduler.

The program enters the throttle valve position $\theta r$ at step 120, the accelerator pedal position $\theta t$ at step 121, and calculates a deviation $\theta r - \theta t$. Then the program proceeds to normal step 124 when the following conditions are not satisfied, and calculates the motor current value i.

(1) The step 123 determines target position $\theta t = 0$ or
(2) The step 127 determines target position $\theta t$ is approximately equal to real position $\theta r$.

where, current i is given by $$i = A(\theta_t - \theta_r) - B\Delta\theta_r + C(\theta_r - \theta_0')$$

$$A = \frac{Is'(a^2 + b^2)}{Km' \cdot G}$$

-continued $$B = \frac{Is'2a}{Km' \cdot G}$$

$$C = \frac{Ks'}{Km' \cdot G}$$

Then at step 125, the program sets a "flag 1" and output current value i at step 126.

On the other hand, when the target value $\theta t = 0$ and real position $\theta r$ is approximately equal to $\theta t$, step 128 judges whether or not $\Delta\theta r$ is zero. If $\Delta\theta r$ is zero at the step 128 and flag = 1 at step 129, the program proceeds to step 130 to calculate $i_1 = i_1 + \Delta i$. Then the program calculates current value i and $i_2$ at steps 131, 132 and determines current value i.

If Flag = $-1$ at the step 129, the program calculates $i_2 = i_2 - \Delta i$ at step 136, and determines the current value i at step 137.

When Flag = 0 at step 129, initial setting of the current i and $i_1$ is performed at step 135.

When $\Delta\theta r < 0$ at the step 128, the program proceeds to step 139 to make Flag clear and determines a learned value $\theta_0'$ at step 140. As mentioned above, the learned value $\theta_0'$ determined by learning process is given by the following equation.

$$\theta_0' = \frac{Km'}{Ks'}(i_1 + i_2)$$

The control thereafter is performed using the learned value $\theta_0'$.

In the above system, if the influences of the friction torque constant $T_f$ of the block 110 in the actuating system composed of the D.C. motor 8, the throttle valve 6 and the return spring 10 in the block 108 are low enough to be neglected, no serious problem is raised by the control signals of the aforementioned three kinds. The influences due to the presence of the friction torque constant $T_f$, however, cannot be neglected so that a high precision cannot be attained. In case, significant torque is present in the actuating system, it is so influenced by the friction torque constant $T_f$ represented by a block 110 as to appear as the difference between the target opening degree $\theta t$ and the actual opening degree $\theta r$.

In the present embodiment, the aforementioned friction correction signal calculating means 54 includes the block 106 which acts in the control block as the correction term for the friction torque constant $T_f$.

Owing to the presence of the block 106, all the element blocks included in the throttle valve actuating mechanism 108 are considered in the control so that the control can be executed while leaving no difference.

The friction correction signal calculating means 54, i.e., the block 106 is provided with a map indicating the friction torque, which is determined in advance by actual measurement, so that the friction correction signal corresponding to the friction torque constant $T_f$ is generated and inputted to the adding/subtracting means 56.

Incidentally, what raises a problem at this time is that the value of the friction torque constant $T_f$ is changed by the opening or closing rate of the throttle valve 6. Specifically, the frictional force exhibits so highly different values for the static and dynamic frictions that the former is generally considerably larger. If an estimated value corresponding to the movement of the throttle valve 6 is used for the friction torque constant $T_f$, the correction by the friction torque constant $T_f$ is so insufficient, when the stopped throttle valve 6 is to be opened or closed, that the throttle valve 6 is probably immovable. If the estimated value is taken for the stopping of the throttle valve 6, the correction by the friction torque constant $T_f$ may become excessive to overshoot the control.

In this embodiment, the block 106 is provided with two kinds of maps corresponding to the operations when the throttle valve 6 is stopped and when it is being moved. These maps are selected according to the differentiated opening degree value $\theta v$.

The friction correction can always be properly accomplished, irrespective of the control state of the second throttle valve 6, to achieve the TCS control sufficiently in high precision.

Although not especially considered in the embodiment, the frictional force is influenced by the temperature and the moisture. If the friction torque constant $T_f$ is estimated by considering those influences, it goes without saying that the control can be accomplished with a more complete precision.

The embodiment is directed to the case in which the present invention is applied to the control of the opening degree of the throttle valve for the TCS of the automobile. The present invention should not be limited to that application but can naturally be applied to any valve mechanism in case the valve is opened or closed by the use of an actuator. It is needless to say that the effects of the present invention can be expected in any of those case. According to the present invention, sufficient considerations can be taken into the control factors existing in the actuating system using the actuator such as the throttle valve of the internal combustion engine so that the valve opening degree can be controlled in high precision without difficulty to give highly precise control characteristics to the TCS of the automobile.

We claim:

1. An electronic throttle valve opening degree control system having a DC motor for adjusting the opening of a throttle valve in response to a difference between a target value of throttle valve opening degree and a detected value of throttle valve opening degree, comprising:

target opening calculating means for generating a value representing a target throttle valve opening degree;

differential proportion control signal calculating means for generating a first control signal proportional to the difference between the value of said target throttle valve opening degree and a detected value representing actual throttle valve opening degree;

opening degree proportional signal calculating means for generating an opening degree proportional signal in response to the detected value of actual throttle valve opening degree;

differential means for differentiating the value of said actual throttle valve opening degree to generate a throttle valve opening differentiated value;

differential control signal calculating means for generating a second control signal in response to the throttle valve opening differentiated value;

friction correction signal calculating means for generating a friction correction signal in response to the throttle valve opening differentiated value generated by said differential means;

addition-subtraction means for performing a predetermined calculation using the output signals from the differential proportion control signal calculating means, the opening degree proportion signal calculating means, the differential control signal calculating means, and the friction correction signal calculating means;

voltage detection means for detecting the voltage of said DC motor;

voltage correcting means for correcting the result of said predetermined calculation by the addition-subtraction means in response to the DC motor voltage detected by the voltage detection means;

duty control signal calculating means for generating a duty signal for control of the DC motor in response to the output of the voltage correcting means; and motor drive means for controlling the DC motor to control the opening of the throttle valve in response to the duty signal of the duty control signal calculating means.

2. An electronic throttle valve opening degree control system having a first throttle valve which is operated directly by an accelerator pedal and a second throttle valve which is operated by a DC motor acting as an actuator, the DC motor adjusting the opening of a throttle valve in response to a difference between a value of target throttle valve opening degree and a detected value of throttle valve opening degree, comprising:

target opening calculating means for generating a value representing target throttle valve opening degree;

differential proportional control signal calculating means for generating a first control signal proportional to the difference between the value of said target throttle valve opening degree and a detected value representing actual throttle valve opening degree;

opening degree proportional signal calculating means for generating an opening degree proportional signal in response to the detected value of actual throttle valve opening degree;

differential means for differentiating the value of said actual throttle valve opening degree to generate a throttle valve opening differentiated value;

differential control signal calculating means for generating a second control signal in response to the throttle valve opening differentiated value;

friction correction signal calculating means for generating a friction correction signal in response to the throttle valve opening differentiated value generated by said differential means;

addition-subtraction means for performing a predetermined calculation using the output signals from the differential proportion control signal calculating means, the opening degree proportion signal calculating means, the differential control signal calculating means, and the friction correction signal calculating means to produce an output control signal; and motor drive means for controlling the DC motor to control the opening of said second throttle valve in response to the output control signal of the addition-subtraction means.

3. An electronic throttle valve opening degree control system according to claim 2, further comprising:

duty control signal calculating means for generating a duty signal for control of the DC motor in response to the output of the addition-subtraction means.

4. An electronic throttle valve opening degree control system according to claim 2, further comprising:
   voltage detection means for detecting the voltage of said DC motor; and
   voltage correcting means for correcting the output control signal of the addition-subtraction means in response to the DC motor voltage detected by the voltage detection means.

5. An electronic throttle valve opening degree control system, comprising:
   a DC motor for adjusting the opening of a throttle valve in response to an opening degree control signal;
   calculation means for generating said opening degree control signal in response to a difference between a target value of throttle valve opening degree and a detected value of throttle valve opening degree;
   differential means for differentiating the value of said actual throttle valve opening degree to generate a throttle valve opening differentiated value;
   friction correction signal calculating means for generating a friction correction signal in response to the throttle valve opening differentiated value generated by said differential means and for supplying said friction correction signal to said calculation means to effect compensation of said opening degree control signal for secular changes in the friction and inertia of said DC motor and said throttle valve; and
   motor drive means responsive to the compensated opening degree control signal for controlling said DC motor to control the opening of said throttle valve.

6. An electronic throttle valve opening degree control system according to claim 5, wherein said friction correction signal calculating means includes a map of correction values for respective throttle valve opening differentiated values.

7. An electronic throttle valve opening degree control system according to claim 5, wherein said friction correction signal calculating means includes first and second maps providing respective sets of correction values for respective throttle valve opening differentiated values for providing friction correction signals when the throttle valve is stopped and when it is moving, respectively.

8. An electronic throttle valve opening degree control system according to claim 5, further including:
   voltage detection means for detecting the voltage of said DC motor; and
   voltage correction means for correcting the compensated opening degree control signal provided by said calculation means in response to the DC motor voltage detected by the voltage detection means.

* * * * *